United States Patent
Kim et al.

(10) Patent No.: US 11,477,453 B2
(45) Date of Patent: Oct. 18, 2022

(54) IMAGE CODING APPARATUS AND METHOD THEREOF BASED ON A QUANTIZATION PARAMETER DERIVATION

(71) Applicant: LG ELECTRONICS INC., Seoul (KR)

(72) Inventors: Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/859,105

(22) Filed: Apr. 27, 2020

(65) Prior Publication Data
US 2020/0260084 A1    Aug. 13, 2020

Related U.S. Application Data

(63) Continuation of application No. PCT/KR2019/002520, filed on Mar. 5, 2019.
(Continued)

(51) Int. Cl.
*H04N 19/124*  (2014.01)
*H04N 19/176*  (2014.01)
(Continued)

(52) U.S. Cl.
CPC ......... *H04N 19/124* (2014.11); *H04N 19/176* (2014.11); *H04N 19/186* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 4,979,187 A * | 12/1990 | Aoki | H03M 3/042 |
| | | | 375/245 |
| 9,813,712 B2 | 11/2017 | Oh et al. | |

(Continued)

FOREIGN PATENT DOCUMENTS

| | | |
|---|---|---|
| CN | 104584559 A | 4/2015 |
| CN | 106162185 A | 11/2016 |

(Continued)

OTHER PUBLICATIONS

S. Ikonin et al., "AHG15: Signaling of chroma Qp mapping table", Joint Video Experts Team (JVET) of ITU-T SG 16 WP 3 and ISO/IEC JTC 1/SC 29/WG 11, Jul. 3-12, 2019, JVET-O0186-V2.

(Continued)

*Primary Examiner* — Reza Aghevli
(74) *Attorney, Agent, or Firm* — Dentons US LLP

(57) ABSTRACT

According to an embodiment of the present invention, a picture decoding method performed by a decoding apparatus is provided. The method comprises: decoding image information comprising information on a quantization parameter (QP), deriving an expected average luma value of a current block from neighboring available samples, deriving a quantization parameter offset (QP offset) for deriving a luma quantization parameter (luma QP) based on the expected average luma value and the information on the QP, deriving the luma QP based on the QP offset, performing an inverse quantization for a quantization group comprising the current block based on the derived luma QP, generating residual samples for the current block based on the inverse quantization, generating prediction samples for the current block based on the image information and generating reconstructed samples for the current block based on the residual samples for the current block and the prediction samples for the current block.

14 Claims, 10 Drawing Sheets

Related U.S. Application Data

(60) Provisional application No. 62/651,243, filed on Apr. 1, 2018.

(51) Int. Cl.
 *H04N 19/186* (2014.01)
 *H04N 19/70* (2014.01)

(56) References Cited

U.S. PATENT DOCUMENTS

| | | | |
|---|---|---|---|
| 2008/0298469 A1* | 12/2008 | Liu | H04N 19/186 375/E7.14 |
| 2013/0188693 A1* | 7/2013 | Xu | H04N 19/124 375/240.03 |
| 2014/0003497 A1* | 1/2014 | Sullivan | H04N 19/126 375/240.03 |
| 2014/0362904 A1* | 12/2014 | Lim | H04N 19/136 375/240.02 |
| 2015/0264354 A1* | 9/2015 | Zhang | H04N 19/102 375/240.03 |
| 2015/0358631 A1* | 12/2015 | Zhang | H04N 19/176 375/240.16 |
| 2016/0366422 A1* | 12/2016 | Yin | H04N 19/70 |
| 2016/0373751 A1* | 12/2016 | Xu | H04N 19/159 |
| 2016/0373755 A1 | 12/2016 | Xu et al. | |
| 2018/0020241 A1* | 1/2018 | Li | H04N 19/50 |
| 2018/0048901 A1* | 2/2018 | Zhang | H04N 19/124 |
| 2018/0070084 A1 | 3/2018 | Lim et al. | |
| 2018/0167615 A1* | 6/2018 | Kim | H04N 19/98 |
| 2018/0367794 A1* | 12/2018 | Xu | H04N 19/70 |
| 2018/0376143 A1* | 12/2018 | Andersson | H04N 19/126 |
| 2019/0020875 A1* | 1/2019 | Liu | H04N 19/192 |
| 2019/0238849 A1* | 8/2019 | Fang | H04N 19/184 |
| 2019/0297337 A1* | 9/2019 | Ramasubramonian | H04N 19/124 |
| 2020/0213626 A1* | 7/2020 | Ikai | H04N 19/45 |
| 2020/0322602 A1* | 10/2020 | Huang | H04N 19/96 |
| 2020/0359024 A1* | 11/2020 | Misra | H04N 19/119 |
| 2020/0382782 A1* | 12/2020 | Chien | H04N 19/42 |

FOREIGN PATENT DOCUMENTS

| | | | | |
|---|---|---|---|---|
| CN | 107852512 A | | 3/2018 | |
| GB | 2501535 A | * | 10/2013 | H04N 11/28 |
| KR | 20160033791 A | * | 3/2016 | H04N 19/80 |
| WO | 10-2016-199409 A1 | | 12/2016 | |
| WO | 2017052440 A1 | | 3/2017 | |
| WO | 2017093189 A1 | | 6/2017 | |

OTHER PUBLICATIONS

S. Paluri et al., "AHG15: Chroma Quantization Qpc Parameter Signalling", Joint Video Experts Team (JVET) of ITU-T SG 16 WP 3 and ISO/IEC JTC 1/SC 29/WG 11, Jul. 3-12, 2019, JVET-O0298-r1.

A. Ramasubramonian et al., "AHG15: On signalling of chroma QP tables", Joint Video Experts Team (JVET) of ITU-T SG 16 WP 3 and ISO/IEC JTC 1/SC 29/WG 11, Jul. 3-12, 2019, JVET-O0650-v1.

International Telecommunication Union, ITU-T Telecommunication Standardization Sector of ITU, H.266 (Aug. 2020), Series H: Audiovisual and Multimedia Systems Infrastructure of audiovisual services—Coding of moving video, Versatile video coding.

A. Ramasubramonian et al., "AHG15: On signalling of chroma QP tables", Joint Video Experts Team (JVET) of ITU-T SG 16 WP 3 and ISO/IEC JTC 1/SC 29/WG 11, Jul. 3-12, 2019, JVET-O0650-V4.

* cited by examiner

IMAGE CODING APPARATUS AND METHOD THEREOF BASED ON A QUANTIZATION PARAMETER DERIVATION

CROSS-REFERENCE TO RELATED APPLICATIONS

Pursuant to 35 U.S.C. § 119(e), this application is a continuation of International Application PCT/KR2019/002520, with an international filing date of Mar. 5, 2019, which claims the benefit of U.S. Provisional Application No. 62/651,243 filed on Apr. 1, 2018, the contents of which are all hereby incorporated by reference herein in their entirety.

TECHNICAL FIELD

The present invention relates to an image coding technique. More specifically, the present invention relates to an image coding apparatus and method thereof based on a quantization parameter derivation in an image coding system.

BACKGROUND ART

Demand for high-resolution, high-quality images such as high definition (HD) images and ultra high definition (UHD) images has recently increased in various fields. As the image data has high resolution and high quality, the amount of information or bits to be transmitted increases relative to the existing image data. Therefore, when the image data is transmitted using a medium such as a wired/wireless broadband line, or when stored, the transmission cost and the storage cost may be increased.

Accordingly, there is a need for a highly efficient image compression technique for efficiently transmitting, storing, and reproducing information of high resolution and high quality images.

DISCLOSURE

Technical Problem

The present invention provides a method and apparatus for enhancing video coding efficiency.

The present invention also provides a method and an apparatus for increasing the quantization efficiency.

The present invention also provides a method and apparatus for efficiently deriving a quantization parameter.

Technical Solution

According to an embodiment of the present invention, a picture decoding method performed by a decoding apparatus is provided. The method comprises: decoding image information comprising information on a quantization parameter (QP), deriving an expected average luma value of a current block from neighboring available samples, deriving a quantization parameter offset (QP offset) for deriving a luma quantization parameter (luma QP) based on the expected average luma value and the information on the QP, deriving the luma QP based on the QP offset, performing an inverse quantization for a quantization group comprising the current block based on the derived luma QP, generating residual samples for the current block based on the inverse quantization, generating prediction samples for the current block based on the image information and generating reconstructed samples for the current block based on the residual samples for the current block and the prediction samples for the current block.

According to an embodiment of the present invention, a decoding apparatus decoding a picture is provided. The decoding apparatus comprises: an entropy decoding module configured to decode image information comprising information on a quantization parameter (QP), an inverse quantization module configured to derive an expected average luma value of a current block from neighboring available samples, derive a quantization parameter offset (QP offset) for deriving a luma quantization parameter (luma QP) based on the expected average luma value and the information on the QP, derive the luma QP based on the QP offset, and perform an inverse quantization for a quantization group comprising the current block based on the derived luma QP, an inverse transform module configured to generate residual samples for the current block based on the inverse quantization, a prediction module configured to generate prediction samples for the current block based on the image information and a reconstruction module configured to generate reconstructed samples for the current block based on the residual samples for the current block and the prediction samples for the current block.

According to an embodiment of the present invention, a picture encoding method performed by an encoding apparatus is provided. The method comprises: deriving an expected average luma value of a current block from neighboring available samples, deriving a quantization parameter offset (QP offset) for deriving a luma quantization parameter (luma QP) based on the expected average luma value and information on the QP, deriving the luma QP based on the QP offset, performing a quantization for a quantization group comprising the current block based on the derived luma QP and encoding image information comprising the information on the QP.

According to an embodiment of the present invention, an encoding apparatus encoding a picture is provided. The encoding apparatus comprises: a quantization module configured to derive an expected average luma value of a current block from neighboring available samples, derive a quantization parameter offset (QP offset) for deriving a luma quantization parameter (luma QP) based on the expected average luma value and information on the QP, derive the luma QP based on the QP offset, and perform a quantization for a quantization group comprising the current block based on the derived luma QP, and entropy encoding module configured to encode image information comprising the information on the QP.

Advantageous Effects

According to the present invention, the overall image/video compression efficiency can be increased.

According to the present invention, the quantization efficiency may be increased.

According to the present invention, the quantization parameter may be derived efficiently.

BEST MODE

Figure 1:
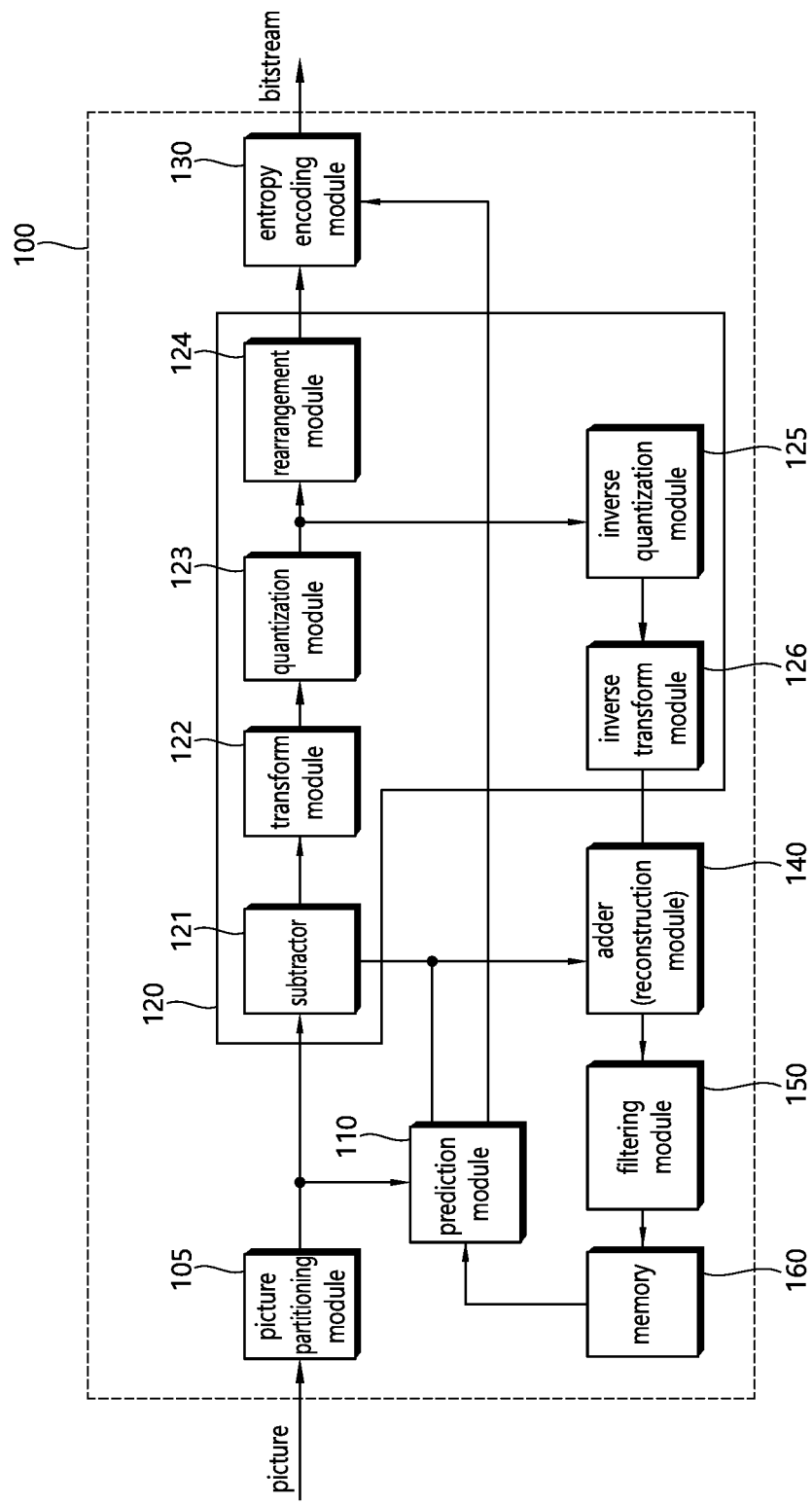
FIG. 1 is a schematic diagram illustrating a configuration of an encoding apparatus according to an embodiment.

According to an embodiment of the present invention, a picture decoding method performed by a decoding apparatus is provided. The method comprises: decoding image information comprising information on a quantization parameter (QP), deriving an expected average luma value of a current block from neighboring available samples, deriving a quantization parameter offset (QP offset) for deriving a luma quantization parameter (luma QP) based on the expected average luma value and the information on the QP, deriving the luma QP based on the QP offset, performing an inverse quantization for a quantization group comprising the current block based on the derived luma QP, generating residual samples for the current block based on the inverse quantization, generating prediction samples for the current block based on the image information and generating reconstructed samples for the current block based on the residual samples for the current block and the prediction samples for the current block.

MODE FOR INVENTION

The present invention may be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings. In addition, same reference numerals are used to indicate same elements throughout the drawings, and the same descriptions on the like elements will be omitted.

The following description can be applied in the technical field dealing with video or image. For example, the method or embodiment disclosed in the following description may be applied to various video coding standards such as Versatile Video Coding (VVC) standard (ITU-T Rec. H.266), the next generation video/image coding standard after VVC, or the previous generation video/image coding standard before VVC such as High Efficiency Video Coding (HEVC) standard (ITU-T Rec. H.265) and so on.

In the present specification, video may mean a set of images according to time. A picture generally refers to a unit that represents one image in a specific time period, and a slice is a unit that constitutes a part of a picture in coding. One picture may be composed of a plurality of slices, and pictures and slices may be used in combination if necessary. Also, in some cases, the term "image" may mean a concept including a still image and a video which is a set of still images according to the flow of time. Also, "video" does not necessarily mean only a set of still images according to time, but may be interpreted as a concept that comprises meaning of a still image in some embodiments.

A pixel or a pel may mean a minimum unit of a picture (or image). Also, a 'sample' may be used as a term corresponding to a pixel. A sample may generally represent a pixel or pixel value and may only represent a pixel/pixel value of a luma component or only a pixel/pixel value of a chroma component.

A unit represents a basic unit of image processing. A unit may include at least one of a specific area of a picture and information related to the area. The unit may be used in combination with terms such as a block or an area. In general, an M×N block may represent a set of samples or transform coefficients consisting of M columns and N rows.

FIG. 1 schematically explains a configuration of an encoding apparatus according to an embodiment.

Hereinafter, the encoding/decoding apparatus may include a video encoding/decoding apparatus and/or an image encoding/decoding apparatus. A video encoding/decoding apparatus may be used as a concept including an image encoding/decoding apparatus, and an image encoding/decoding apparatus may be used as a concept including a video encoding/decoding apparatus.

Referring to FIG. 1, an encoding apparatus 100 may include a picture partitioning module 105, a prediction module 110, a residual processing module 120, an entropy encoding module 130, an adder 140, a filtering module 150, and a memory 160. The residual processing unit 120 may include a subtractor 121, a transform module 122, a quantization module 123, a rearrangement module 124, a inverse quantization module 125, and an inverse transform module 126.

The picture partitioning module 105 may divide the inputted picture into at least one processing unit.

In one example, the processing unit may be referred to as a coding unit (CU). In this case, the coding unit may be recursively partitioned according to a quad-tree binary-tree (QTBT) structure from the largest coding unit (LCU). For example, one coding unit may be divided into a plurality of coding units of deeper depth based on a quadtree structure, a binary tree structure, and/or a ternary tree structure.

In this case, for example, the quadtree structure is applied first, and the binary tree structure and the ternary tree structure can be applied later. Or a binary tree structure/ternary tree structure may be applied first. The coding procedure according to the present invention can be performed based on the final coding unit which is not further divided. In this case, the maximum coding unit may be directly used as the final coding unit based on the coding efficiency or the like depending on the image characteristics, or the coding unit may be recursively divided into lower-depth coding units and may be used as the final coding unit. Here, the coding procedure may include a procedure such as prediction, conversion, and restoration, which will be described later.

As another example, the processing unit may include a coding unit (CU) prediction module (PU) or a transform unit (TU). The coding unit may be split from the largest coding unit (LCU) into coding units of deeper depth along the quad tree structure. In this case, the maximum coding unit may be directly used as the final coding unit based on the coding efficiency or the like depending on the image characteristics, or the coding unit may be recursively divided into lower-depth coding units and may be used as the final coding unit. When a smallest coding unit (SCU) is set, the coding unit can not be divided into smaller coding units than the minimum coding unit.

Herein, the term "final coding unit" means a coding unit on which the prediction module or the conversion unit is partitioned or divided. A prediction module is a unit that is partitioned from a coding unit, and may be a unit of sample prediction. At this time, the prediction module may be divided into sub-blocks. The conversion unit may be divided along the quad-tree structure from the coding unit, and may be a unit for deriving a conversion coefficient and/or a unit for deriving a residual signal from the conversion factor.

Hereinafter, the coding unit may be referred to as a coding block (CB), the prediction module may be referred to as a prediction block (PB), and the conversion unit may be referred to as a transform block (TB). The prediction block or prediction module may refer to a specific area in the form of a block in a picture and may include an array of prediction samples. Also, a transform block or transform unit may refer to a specific region in the form of a block within a picture, and may include an array of transform coefficients or residual samples.

The prediction module 110 predicts a current block or a residual block and generates a predicted block including prediction samples of the current block can do. The unit of prediction performed in the prediction module 110 may be a coding block, a transform block, or a prediction block.

The prediction module 110 predicts a current block or a residual block and generates a predicted block including prediction samples of the current block. The unit of prediction performed in the prediction module 110 may be a coding block, a transform block, or a prediction block.

The prediction module 110 can determine whether intra prediction or inter prediction is applied to the current block. For example, the prediction module 110 may determine whether intra prediction or inter prediction is applied in units of CU.

In the case of intra prediction, the prediction module 110 may derive a prediction sample for a current block based on a reference sample outside the current block in a picture to which the current block belongs (hereinafter referred to as a current picture).

In this case, the prediction module 110 may derive a prediction sample based on (case (i)) an average or interpolation of neighboring reference samples of the current block, (case (ii)) the prediction sample may be derived based on a reference sample existing in a specific (prediction) direction with respect to the prediction sample among the samples.

The case (i) may be referred to as a non-directional mode or a non-angle mode, and the case (ii) may be referred to as a directional mode or an angular mode. In the intra prediction, the prediction mode may have, for example, 65 directional prediction modes and at least two non-directional modes. The non-directional mode may include a DC prediction mode and a planar mode (Planar mode). The prediction module 110 may determine a prediction mode applied to a current block using a prediction mode applied to a neighboring block.

In the case of inter prediction, the prediction module 110 may derive a prediction sample for a current block based on a sample specified by a motion vector on a reference picture. The prediction module 110 may derive a prediction sample for a current block by applying one of a skip mode, a merge mode, and a motion vector prediction (MVP) mode. In the skip mode and the merge mode, the prediction module 110 can use motion information of a neighboring block as motion information of a current block.

In the skip mode, difference (residual) between the predicted sample and the original sample is not transmitted unlike the merge mode. In the MVP mode, a motion vector of a current block can be derived by using a motion vector of a neighboring block as a motion vector predictor to use as a motion vector predictor of a current block.

In the case of inter prediction, a neighboring block may include a spatial neighboring block existing in a current picture and a temporal neighboring block existing in a reference picture. The reference picture including the temporal neighboring block may be referred to as a collocated picture (colPic). The motion information may include a motion vector and a reference picture index. Information such as prediction mode information and motion information may be (entropy) encoded and output in the form of a bit stream.

When the motion information of the temporal neighboring blocks is used in the skip mode and the merge mode, the highest picture on the reference picture list may be used as a reference picture. The reference pictures included in the picture order count can be sorted on the basis of the picture order count (POC) difference between the current picture and the corresponding reference picture. The POC corresponds to the display order of the pictures and can be distinguished from the coding order.

The subtractor 121 generates residual samples that are the difference between the original sample and the predicted sample. When the skip mode is applied, a residual sample may not be generated as described above.

The transform module 122 transforms the residual samples on a transform block basis to generate a transform coefficient. The transform unit 122 may perform the transform according to the size of the transform block and a prediction mode applied to the coding block or the prediction block spatially overlapping the transform block.

For example, if intra prediction is applied to the coding block or the prediction block that overlaps the transform block and the transform block is a 4×4 residue array, the residual sample is transformed into a discrete sine transform (DST) In other cases, the residual samples can be converted using a DCT (Discrete Cosine Transform) conversion kernel.

The quantization unit 123 may quantize the transform coefficients to generate quantized transform coefficients.

The rearrangement module 124 rearranges the quantized transform coefficients. The rearrangement module 124 may rearrange the block-shaped quantized transform coefficients into a one-dimensional vector form through a scanning method of coefficients. The rearrangement module 124 may be a part of the quantization module 123, although the rearrangement module 124 is described as an alternative configuration.

The entropy encoding module 130 may perform entropy encoding on the quantized transform coefficients. Entropy encoding may include, for example, an encoding method such as exponential Golomb, context-adaptive variable length coding (CAVLC), context-adaptive binary arithmetic coding (CABAC). The entropy encoding module 130 may encode information necessary for video restoration (e.g., values of a syntax element, etc.) and the quantized transform coefficients together or separately in accordance with an entropy encoding or a predetermined method.

The encoded information may be transmitted or stored in units of NAL (network abstraction layer) units in the form of a bit stream. The bitstream may be transmitted over a network or stored in a digital storage medium. The network may include a broadcasting network and/or a communication network, and the digital storage medium may include various storage media such as USB, SD, CD, DVD, Blu-ray, HDD, and SSD.

The inverse quantization module 125 inversely quantizes the quantized values (quantized transform coefficients) obtained from the quantization module 123 and the inverse transformation module 126 inversely quantizes the inversely quantized values obtained from the inverse quantization module 125 to generate residual samples.

The adder 140 combines the residual sample and the predicted sample to reconstruct the picture. The residual samples and the prediction samples are added in units of blocks so that a reconstruction block can be generated. Here, the adder 140 may be a part of the prediction module 110, meanwhile, the adder 140 may be referred to as a reconstruction module or a reconstruction block generation unit.

For the reconstructed picture, the filtering module 150 may apply a deblocking filter and/or a sample adaptive offset. Through deblocking filtering and/or sample adaptive offsets, artifacts in the block boundary in the reconstructed picture or distortion in the quantization process can be corrected. The sample adaptive offset can be applied on a sample-by-sample basis and can be applied after the process of deblocking filtering is complete. The filtering module 150 may apply an ALF (Adaptive Loop Filter) to the restored picture. The ALF may be applied to the reconstructed picture after the deblocking filter and/or sample adaptive offset is applied.

The memory 160 may store restored pictures (decoded pictures) or information necessary for encoding/decoding. Here, the reconstructed picture may be a reconstructed picture whose filtering procedure has been completed by the filtering module 150. The stored restored picture may be used as a reference picture for (inter) prediction of another picture. For example, the memory 160 may store (reference) pictures used for inter prediction. At this time, the pictures used for inter prediction can be designated by a reference picture set or a reference picture list.

Figure 2:
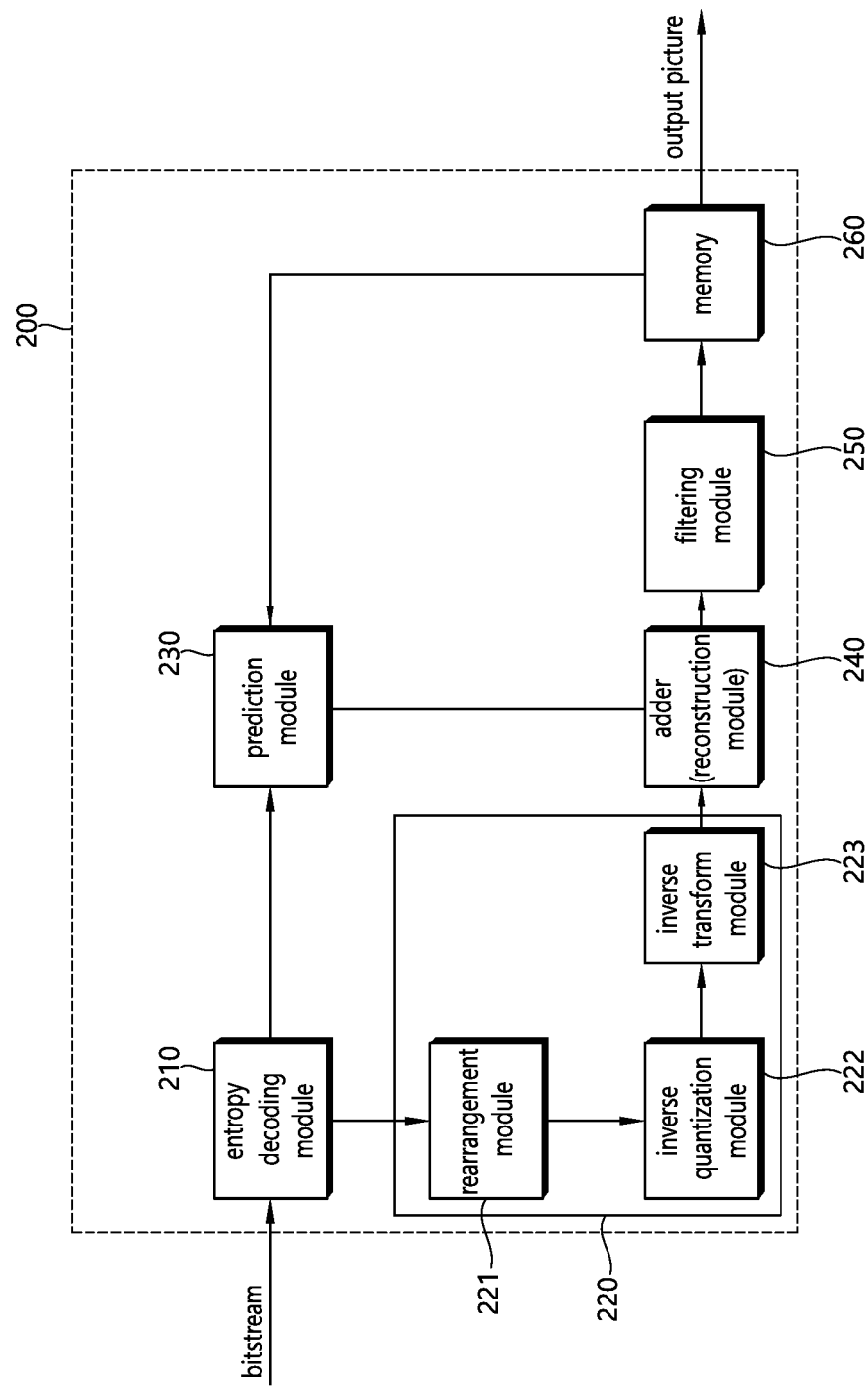
FIG. 2 is a schematic diagram illustrating a configuration of a decoding apparatus according to an embodiment.

FIG. 2 schematically explains a configuration of a decoding apparatus according to an embodiment.

Referring to FIG. 2, decoding apparatus 200 may include an entropy decoding module 210, a residual processing module 220, a prediction module 230, an adder 240, a filtering module 250, and a memory 260. Here, the residual processing module 220 may include a rearrangement module 221, an inverse quantization module 222, and an inverse transform module 223. Also, although not shown, the video decoding apparatus 200 may include a receiver for receiving a bitstream including video information. The receiving unit may be a separate module or may be included in the entropy decoding module 210.

When a bitstream including video/image information is input, the (video) decoding apparatus 200 can restore the video/image/picture in response to the process in which the video/image information is processed in the (video) encoding apparatus 100.

For example, the video decoding apparatus 200 can perform video decoding using a processing unit applied in the video encoding apparatus. Thus, the processing unit block of video decoding may be, for example, a coding unit and, in another example, a coding unit, a prediction module or a conversion unit. The coding unit may be divided from the maximum coding unit along a quadtree structure, a binary tree structure, and/or a ternary tree structure.

A prediction module and a conversion unit may be further used as the case may be. The prediction block may be a block derived or partitioned from the coding unit. The conversion unit may be divided along the quad tree structure from the coding unit and may be a unit that derives the conversion factor or a unit that derives the residual signal from the conversion factor.

The entropy decoding module 210 may parse the bitstream and output information necessary for video restoration or picture restoration. For example, the entropy decoding module 210 decodes information in a bitstream based on a coding method such as exponential Golomb coding, CAVLC, or CABAC, and calculates a value of a syntax element necessary for video restoration and a quantized coefficient value regarding residuals.

More specifically, the CABAC entropy decoding method comprises receiving a bin corresponding to each syntax element in a bitstream, determining a context model based on decoding target syntax element and decoding information of decoding target, predicting the occurrence probability of a bin according to the determined context model, and performing arithmetic decoding of the bin to generate a symbol corresponding to the value of each syntax element. At this time, the CABAC entropy decoding method can update the context model using the information of the decoded symbol/bin for the context model of the next symbol/bin after determining the context model.

The information on the prediction of the decoded information in the entropy decoding module 210 is provided to the prediction module 230 and the residual value in which the entropy decoding is performed in the entropy decoding module 210 can be input to the rearrangement module 221.

The rearrangement module 221 may rearrange the quantized transform coefficients into a two-dimensional block form. The rearrangement module 221 may perform reordering in response to the coefficient scanning performed in the encoding apparatus. The rearrangement module 221 may be a part of the inverse quantization module 222, although the rearrangement module 221 has been described as an alternative configuration.

The inverse quantization module 222 may dequantize the quantized transform coefficients based on the (inverse) quantization parameters, and output the transform coefficients. At this time, the information for deriving the quantization parameter may be signaled from the encoding device.

The inverse transform module 223 may invert the transform coefficients to derive the residual samples.

The prediction module 230 may predict a current block and may generate a predicted block including prediction samples of the current block. The unit of prediction performed by the prediction module 230 may be a coding block, a transform block, or a prediction block.

The prediction module 230 may determine whether intra prediction or inter prediction is to be applied based on the prediction information. In this case, a unit for determining whether to apply intra prediction or inter prediction may differ from a unit for generating a prediction sample. In addition, units for generating prediction samples in inter prediction and intra prediction may also be different. For example, whether inter prediction or intra prediction is to be applied can be determined in units of CU. Also, for example, in the inter prediction, the prediction mode may be determined in units of PU to generate prediction samples. In intra prediction, a prediction mode may be determined in units of PU, and prediction samples may be generated in units of TU.

In the case of intra prediction, the prediction module 230 may derive a prediction sample for the current block based on the neighboring reference samples in the current picture. The prediction module 230 may apply a directional mode or a non-directional mode based on the neighbor reference samples of the current block to derive a prediction sample for the current block. In this case, a prediction mode to be applied to the current block may be determined using the intra prediction mode of the neighboring block.

In the case of inter prediction, the prediction module 230 may derive a prediction sample for a current block based on a sample specified on a reference picture by a motion vector on a reference picture. The prediction module 230 may derive a prediction sample for a current block by applying a skip mode, a merge mode, or an MVP mode. At this time, motion information necessary for inter prediction of a current block provided in the encoding apparatus, for example, information on a motion vector, a reference picture index, and the like, may be acquired or derived based on the prediction information.

In the skip mode and the merge mode, motion information of a neighboring block can be used as motion information of the current block. In this case, the neighboring block may include a spatial neighboring block and a temporal neighboring block.

The prediction module 230 may construct a merge candidate list using the motion information of the available neighboring blocks and use the information indicated by the merge index on the merge candidate list as the motion vector of the current block. The merge index may be signaled from the encoding device. The motion information may include a motion vector and a reference picture. When the motion information of temporal neighboring blocks is used in the skip mode and the merge mode, the highest picture on the reference picture list can be used as a reference picture.

In the skip mode, unlike the merge mode, the difference between the predicted sample and the original sample (residual) is not transmitted.

In the MVP mode, a motion vector of a current block can be derived using a motion vector of a neighboring block as a motion vector predictor. In this case, the neighboring block may include a spatial neighboring block and a temporal neighboring block.

For example, when the merge mode is applied, a merge candidate list may be generated using a motion vector of the reconstructed spatial neighboring block and/or a motion vector corresponding to a Col block that is a temporally neighboring block. In the merge mode, the motion vector of the candidate block selected in the merge candidate list is used as the motion vector of the current block. The prediction information may include a merge index indicating a candidate block having an optimal motion vector selected from the candidate blocks included in the merge candidate list. At this time, the prediction module 230 can derive the motion vector of the current block using the merge index.

As another example, when a motion vector prediction mode (MVP) is applied, a motion vector predictor candidate list is generated by using a motion vector of the reconstructed spatial neighboring block and/or a motion vector corresponding to a Col block which is a temporally neighboring block. That is, the motion vector of the reconstructed spatial neighboring block and/or the motion vector corresponding to the neighboring block Col may be used as a motion vector candidate. The information on the prediction may include a predicted motion vector index indicating an optimal motion vector selected from the motion vector candidates included in the list.

At this time, the predicting module 230 can use the motion vector index to select a predictive motion vector of the current block from the motion vector candidates included in the motion vector candidate list. The predicting unit of the encoding apparatus can obtain the motion vector difference (MVD) between the motion vector of the current block and the motion vector predictor, and can output it as a bit stream. That is, MVD can be obtained by subtracting the motion vector predictor from the motion vector of the current block. In this case, the prediction module 230 may obtain the motion vector difference included in the information on the prediction, and derive the motion vector of the current block through addition of the motion vector difference and the motion vector predictor. The prediction module may also acquire or derive a reference picture index or the like indicating the reference picture from the information on the prediction.

The adder 240 may add a residual sample and a prediction sample to reconstruct a current block or a current picture. The adder 240 may add the residual samples and the prediction samples on a block-by-block basis to reconstruct the current picture. When the skip mode is applied, since the residual is not transmitted, the predicted sample can be the restored sample. Here, the adder 240 has been described as an alternative configuration, but the adder 240 may be a part of the prediction module 230. Meanwhile, the adder 240 may be referred to as a reconstruction module or a reconstruction block generation unit.

The filtering module 250 may apply deblocking filtered sample adaptive offsets, and/or ALFs, to the reconstructed pictures. At this time, the sample adaptive offset may be applied on a sample-by-sample basis and may be applied after deblocking filtering. The ALF may be applied after deblocking filtering and/or sample adaptive offsets.

The memory 260 may store reconstructed pictures (decoded pictures) or information necessary for decoding. Here, the reconstructed picture may be a reconstructed picture whose filtering procedure has been completed by the filtering module 250. For example, the memory 260 may store pictures used for inter prediction. At this time, the pictures used for inter prediction may be designated by a reference picture set or a reference picture list. The reconstructed picture can be used as a reference picture for another picture. In addition, the memory 260 may output the reconstructed picture according to the output order.

Figure 3:
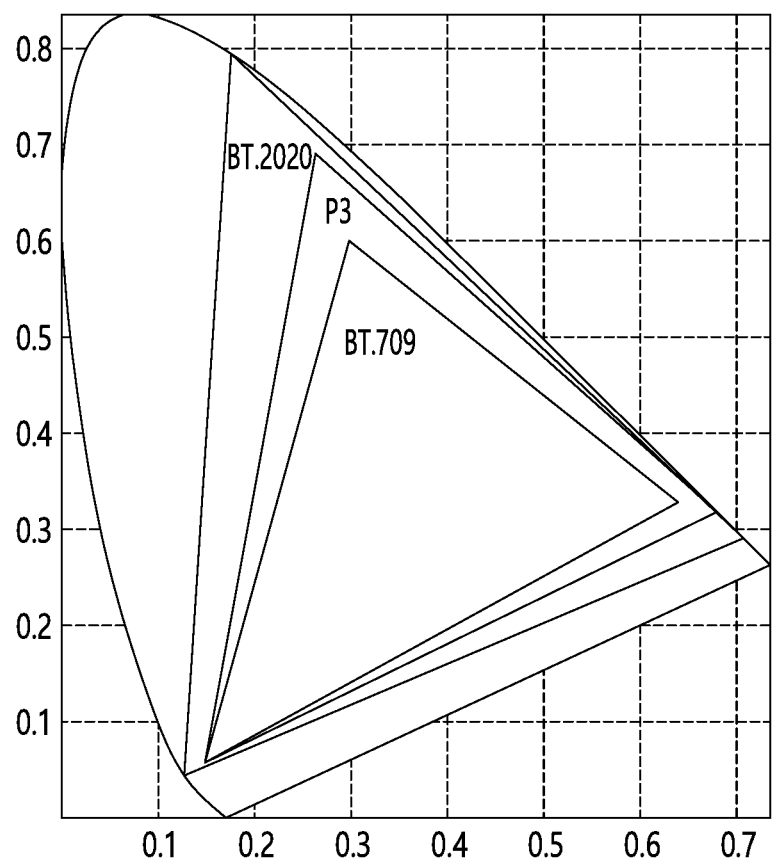
FIG. 3 illustrates an example of a chromaticity diagram.

FIG. 3 illustrates an example of a chromaticity diagram.

This embodiment relates to video coding and more particularly to techniques for optimizing video coding according to given conditions, such as defined or expected luminance transfer function, dynamic range of video, and luminance value of a coding block.

As used herein the term luminance transfer function may refer to an optical-electro transfer function (OETF) or an electro-optical transfer function (EOTF). It should be noted that an optical-electro transfer function may be referred to as an inverse electro-optical transfer function and an electro-optical transfer function may be referred to as an inverse optical-electro transfer function even though the two transfer functions are not exact inverses of each other.

The techniques described herein may be used to compensate for non-optimal video coding performance that occurs when the mapping of luminance values to digital code words is not being considered in equal importance. For example, in practice an OETF may allow more bits to dark area compared to bright area (or vice versa). In this case, a video encoder/decoder designed based on an assumption that all of the digital code words to be coded with equal importance would typically not perform video coding in an optimal manner.

It should be noted that although techniques of this disclosure are described with respect to the ITU-T H.264 standard and the ITU-T H.265 standard, the techniques of this disclosure are generally applicable to any video coding standard.

Video compression technologies have been deployed into a wide range of devices, including digital televisions, desktop computers or laptop, tablet computers, digital recording devices, digital media players, video gaming devices, smart telephones, and so on. Digital video may be coded according to a video coding standard, such as ITU-T H.264 known as ISO/IEC MPEG-4 AVC and High-Efficiency Video Coding (HEVC). Video coding standards may allow specific format (i.e. YUV420) to be coded.

A conventional digital video camera initially generates raw data corresponding to signals generated by each of its image sensors. For example, digital image capturing devices record an image as a set of linearly related luminance values. However, human vision does not recognize changes in luminance values in a linear manner. That is, for example, an area of an image associated with a luminance value of 100 cd/m2 is not necessarily perceived as twice as bright an area of an image associated with a luminance value of 200 cd/m2. As such, a luminance transfer function (e.g., an optical-electro transfer function (OETF) or an electro-optical transfer function (EOTF)) may be used to convert linear luminance data into data that can be perceived in a meaningful way. An optical-electro transfer function (OETF) may map absolute linear luminance values to digital code words in a non-linear manner. The resulting digital code words may be converted into video format supported by a video coding standard.

Traditional video coding/displaying system such as conventional television video distribution environments has provided Standard Dynamic Range (SDR), typically supporting a range of brightness of around 0.1 to 100 cd/m2 (often referred to as "nits"). This range is significantly smaller than the range encountered in real life. For example, a light bulb can have more than 10,000 cd/m2, surfaces lit in the sunlight can have brightness upwards of hundreds of thousands of cd/m2, while the night sky can be 0.005 cd/m2 or lower.

In recent years, LCD and OLED displays have become widely used, and the technologies of these devices enable higher luminance and wide color space reproduction. The achievable and desired brightness and dynamic ranges of various displays may be significantly different from those of the conventional (SDR) capturing and creating devices. For example, a content creation system may be able to create or capture content with a contrast of 1,000,000:1. Television and other video distribution environments are expected to give a viewing experience that is closer to a real life experience, to provide the user with a stronger sense of "being there". Instead of the existing SDR brightness range (which may be from 0.1 to 100 cd/m2) higher brightness range (from 0.005 to 10,000 cd/m2) may be considered. For example, when HDR content is displayed on a display, which supports minimum and maximum brightness of 0.01 and 2,000 cd/m2 respectively, it may have a dynamic range of 200,000:1. Note that the dynamic range of a scene can be described as the ratio of the maximum light intensity to the minimum light intensity In addition Ultra High Definition Television (UHDTV) is targeting to provide a user a sense of "reality". Increasing resolution alone may not be sufficient to fully attain this goal, without also creating, capturing and displaying content that has much higher peak brightness and much larger contrast values than today's TV. In addition, a greater sense of reality requires rendering colours that are richer than those provided by the colour gamuts commonly used today, e.g. BT.709. Thus, new content will not only have orders of magnitude greater brightness and contrast, but also significantly wider colour gamut (e.g. BT.2020 or possibly even wider in the future). The various ranges of color gamut are depicted in FIG. 1.

Extending beyond this most recent technological evolutions, HDR (High Dynamic Range) image/video reproduction can now be achieved using appropriate transfer functions (OETF/EOTF) for both the production side and the consumer side.

Figure 4:
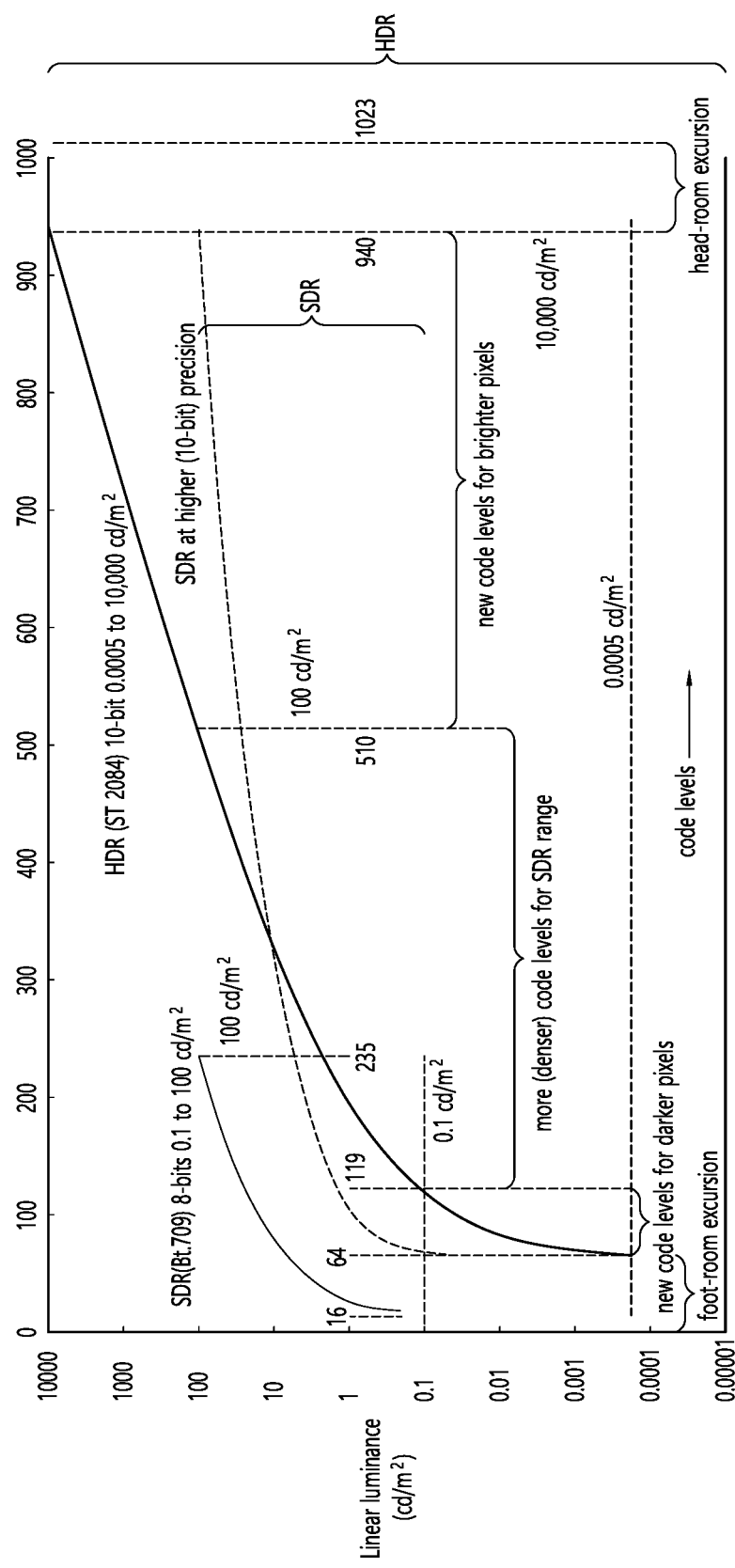
FIG. 4 illustrates an example of mapping of linear light values for SDR and HDR representations.

FIG. 4 illustrates an example of mapping of linear light values for SDR and HDR representations.

A transfer function may be described as a mapping between input and output in the real-valued (floating point) range [0.0, 1.0]. One example of luminance transform functions corresponding to HDR data include the so-called SMPTE (Society of Motion Picture and Television) High Dynamic Range (HDR) Transfer Functions, which may be referred to as SMPTE ST 2084. Another example of luminance transform functions corresponding to HDR data includes Hybrid Log Gamma Transfer Function for HDR signal (also known as ITU-R BT.2100). Specifically, the SMPTE HDR Transfer Functions include an EOTF and an inverse-EOTF. The SMPTE ST 2084 inverse-EOTF is described according to the following set of Math Figures.

$$L_c = R/10,000 \quad \text{[Math FIG. 1]}$$

$$V = ((c_1 + c_2 \cdot L_c^n)/(1 + c_3 \cdot L_c^n))^m \quad \text{[Math FIG. 2]}$$

In Math FIG. 1 and Math FIG. 2, c1=c3−c2+1=3424/4096=0.8359375, c2=32*2413/4096=18.8515625, c3=32*2392/4096=18.6875, m=128*2523/4096=78.84375, and n=0.25*2610/4096=0.1593017578125.

The SMPTE ST 2084 EOTF may be described according to the following set of Math Figures $$L_c = ((\max[(V^{1/m} - c_1), 0])/(c_2 - c_3 * V^{1/m}))^{1/n} \quad \text{[Math FIG. 3]}$$

$$R = 10,000 * Lc \quad \text{[Math FIG. 4]}$$

In the equations above, R is a luminance value with an expected range of 0 to 10,000 cd/m². For example, $L_c$ equal to 1 is intended to correspond to a luminance level of 10,000 cd/m². R may indicate absolute linear luminance value. Further, in the equations above, V may be referred to as luminance value (or perceptual curve value). Since an OETF may map perceptual curve values to digital code words.

Figure 5:
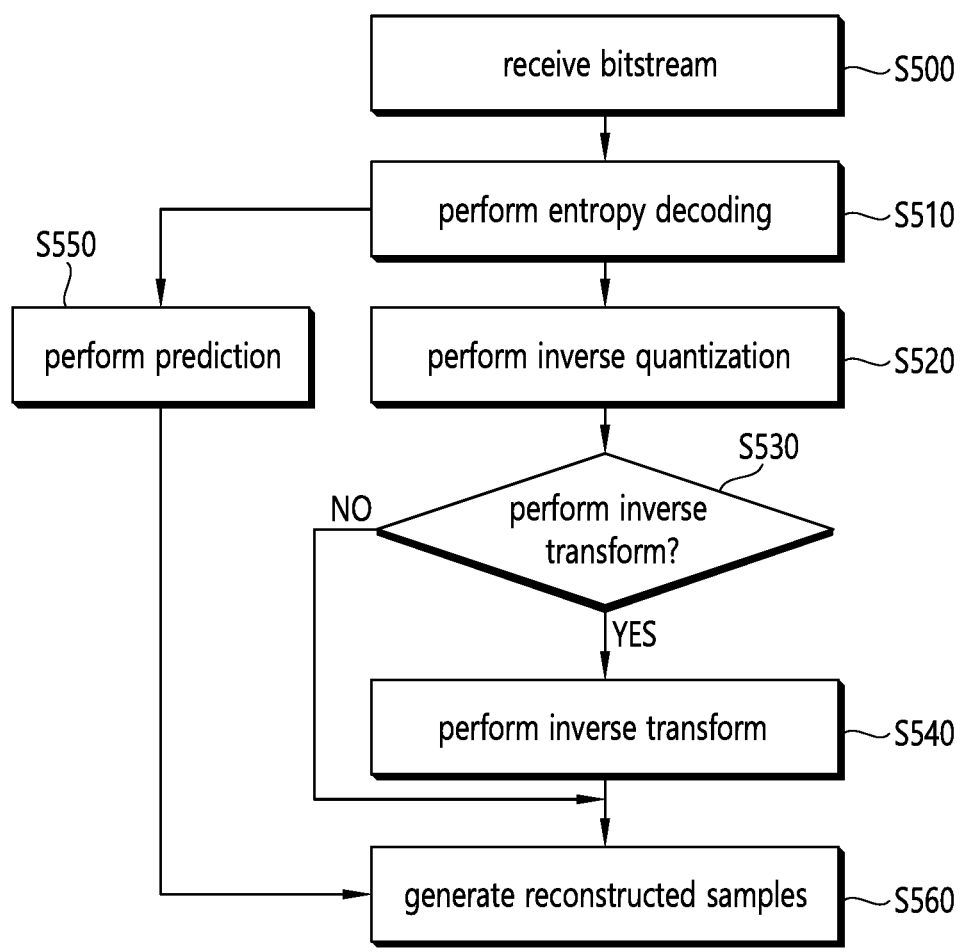
FIG. 5 is a flow chart illustrating a process of reconstructing a picture according to an embodiment.

Hence, V may be mapped to $2^N$ bit code words. An example of a function that may be used to map V to N-bit code words may be defined as:

$$\text{Digital Value} = \text{INT}((2^N-1)*V) \qquad \text{[Math FIG. 5]}$$

In Math FIG. 5, INT(x) generates an integer value by rounding down for fractional values less than 0.5 and rounding up for fractional values greater than or equal to 0.5.

in greater detail below, techniques in HEVC and existing video compression system that are based on quantization parameter values may not perform optimally since it quantizes the entire range of code words in equal importance regardless of luminance value.

Meanwhile, some examples regarding standards to support HDR video processing/coding are described below in Table 1.

TABLE 1

| |
|---|
| ITU-R BT.709 (known as Rec709): defines standardard format of high-definition television, having 16:9 (widescreen) aspect ratio |
| ITU-R BT.2020 (known as Rec2020): defines various aspects of ultra-high-definition television (UHDTV) with standard dynamic range (SDR) and wide color gamut (WCG), including picture resolutions, frame rates with progressive scan, bit depths, color primaries |
| ITU-R BT.2100: Defines various aspects of high dynamic range (HDR) video such as display resolution (HDTV and UHDTV), bit depth, Bit Values (Files), frame rate, chroma subsampling, color space |
| ST 2084 (SMPTE ST 2084): Specifies an EOTF characterizing high-dynamic-range reference displays used primarily for mastering non-broadcast content. This standard also specifies an Inverse-EOTF derived from the EOTF (the Barton PQ curve) |
| ARIB STD-B67 (known as Log-Gamma (HLG)): is a high dynamic range (HDR) standard that was jointly developed by the BBC and NHK. HLG defines a nonlinear transfer function in which the lower half of the signal values use a gamma curve and the upper half of the signal values use a logarithmic curve. |

As an illustrative example, FIG. 2 compares an 8-bit SDR system capable of representing 0.1 to 100 cd/m² with a BT.709 style transfer function (green curve) to a 10-bit HDR system capable of representing 0.005 to 10,000 cd/m² with another transfer function (SMPTE ST 2084). The plots in this figure are approximate plots. They do not capture the exact form of the curve and are shown for illustration purposes only. In the figure, the integer code levels are along the horizontal axis and linear light values (scaled to log 10) are along the vertical axis. This illustrative mapping includes traditional code level range proportions to accommodate both foot-room ("negative" samples below the [0.0, 1.0] real-valued range) and head-room (samples above real-value 1.0). Due to design properties, the 10-bit HDR transfer function shown here assigns approximately twice as many code levels [119 to 509] as the traditional 8-bit SDR transfer function assigns [16 to 235] in the SDR range, while providing a similar number of new code levels [510 to 940] to extend brightness. New code levels [64 to 118] are assigned for darker intensities below 0.01 cd/m².

In a sense, the 10-bit HDR system illustrated here distributes the extra 2-bits over traditional consumer 8-bit "SDR" video by assigning approximately 1 extra bit of precision within the traditional SDR intensity range, while applying the other extra bit to extend the curve to intensities greater than 100 cd/m². For comparison, the 10-bit SDR transfer function is also plotted (red dash curve).

Although current video coding standards may code video data without considering luminance transfer functions, the performance of a video coding standard may be affected by luminance transfer functions because the distribution of code words may be dependent on luminance transfer functions. For example, a video coding standard may be based on an assumption that each code word is generally mapped to equal importance in the aspect of human visual sensitivity (HVS). However, it may not always be true in reality. There are many transfer functions available and each transfer function has its own mapping rule which is not universal. Therefore, this may result in non-optimal performance of a video coder, such as HEVC. For example, and as described FIG. 5 is a flow chart illustrating a process of reconstructing a picture according to an embodiment.

Video content typically includes video sequences comprised of a group of pictures/frames (GOP). Each video frame or picture may include multiple slices, where a slice includes a plurality of video blocks. A video block may be defined as the largest array of pixel values (also referred to as samples) that may be predictively coded. A video encoder/decoder applies predictive coding on video blocks and sub-divisions thereof. ITU-T H.264 specifies a macroblock including 16×16 luma samples. ITU-T H.265 (or commonly known as HEVC) specifies an analogous Coding Tree Unit (CTU) structure where a picture may be split into CTUs of equal size and each CTU may include Coding Blocks (CBs) having 16×16, 32×32, or 64×64 luma samples. In JEM which is exploration model for beyond HEVC, CTU may include Coding Blocks having 128×128, 128×64, 128×32, 64×64, or 16×16 and so on. Here, coding block, prediction block, and transform block may be the same each other. Specifically, Coding block (prediction block and transform block) may be square or non-square blocks.

According to an embodiment, decoding apparatus may receive bitstream (S500), perform entropy decoding (S510), perform inverse quantization (S520), determine whether to perform inverse transform (S530), perform inverse transform (S540), perform prediction (S550) and generate reconstructed samples (S560). More specific descriptions regarding the embodiment are as shown below.

As described above, prediction syntax elements may associate a coding block thereof with corresponding reference samples. For example, for intra-prediction coding an intra-prediction mode may specify the location of reference samples. In ITU-T H.265, possible intra-prediction modes for a luma component include a planar prediction mode (predMode: 0), a DC prediction (predMode: 1), and multiple angular prediction modes (predMode: 2-N, here N may be 34 or 65 or more). One or more syntax elements may identify one of the preintra-prediction modes. For inter-prediction coding, a motion vector (MV) identifies reference samples in a picture other than the picture of a coding block to be coded and thereby exploits temporal redundancy in video. For example, a current coding block may be predicted from a reference block located in a previously coded frame and a motion vector may be used to indicate the location of the reference block. A motion vector and associated data may describe, for example, a horizontal component of the motion vector, a vertical component of the motion vector, a resolution for the motion vector (e.g., one-quarter pixel precision), a prediction direction and/or a reference picture index value. Further, a coding standard, such as, for example HEVC, may support motion vector prediction. Motion vector prediction enables a motion vector to be specified using motion vectors of neighboring blocks.

Video encoder may generate residual data by subtracting a predictive video block from a source video block. The predictive video block may be intra predicted or inter (motion vector) predicted. The residual data is obtained in the pixel domain. Transform coefficients are obtained by applying a transform, such as a discrete cosine transform (DCT), a discrete sine transform (DST), or a conceptually similar transform, to the residual block to produce a set of residual transform coefficients. Transform coefficient generator may output residual transform coefficients to coefficient quantization unit.

Quantization parameter (QP) derivation process is summarized as follows.

The first step is derivation of luma QP. a) Finding predicted luma quantization parameter ($qP_{Y\_PRED}$) based on previously coded (available) quantization parameters, b) obtaining cu_delta_QP offset which indicates the difference between predicted QP (obtained in a) and actual QP, and c) Determination of luma QP value based on bit-depth, predicted QP, and cu_delta_QP.

The second step is derivation of chroma QP. a) Chroma QP is derived from luma QP, b) Chroma QP offset is found from PPS level offset (i.e. pps_cb_qp_offset, pps_cr_qp_offset) and slice level chroma QP offset (i.e. slice_cb_qp_offset, slice_cr_qp_offset).

The followings are details of the above mentioned processes.

Figure 6:
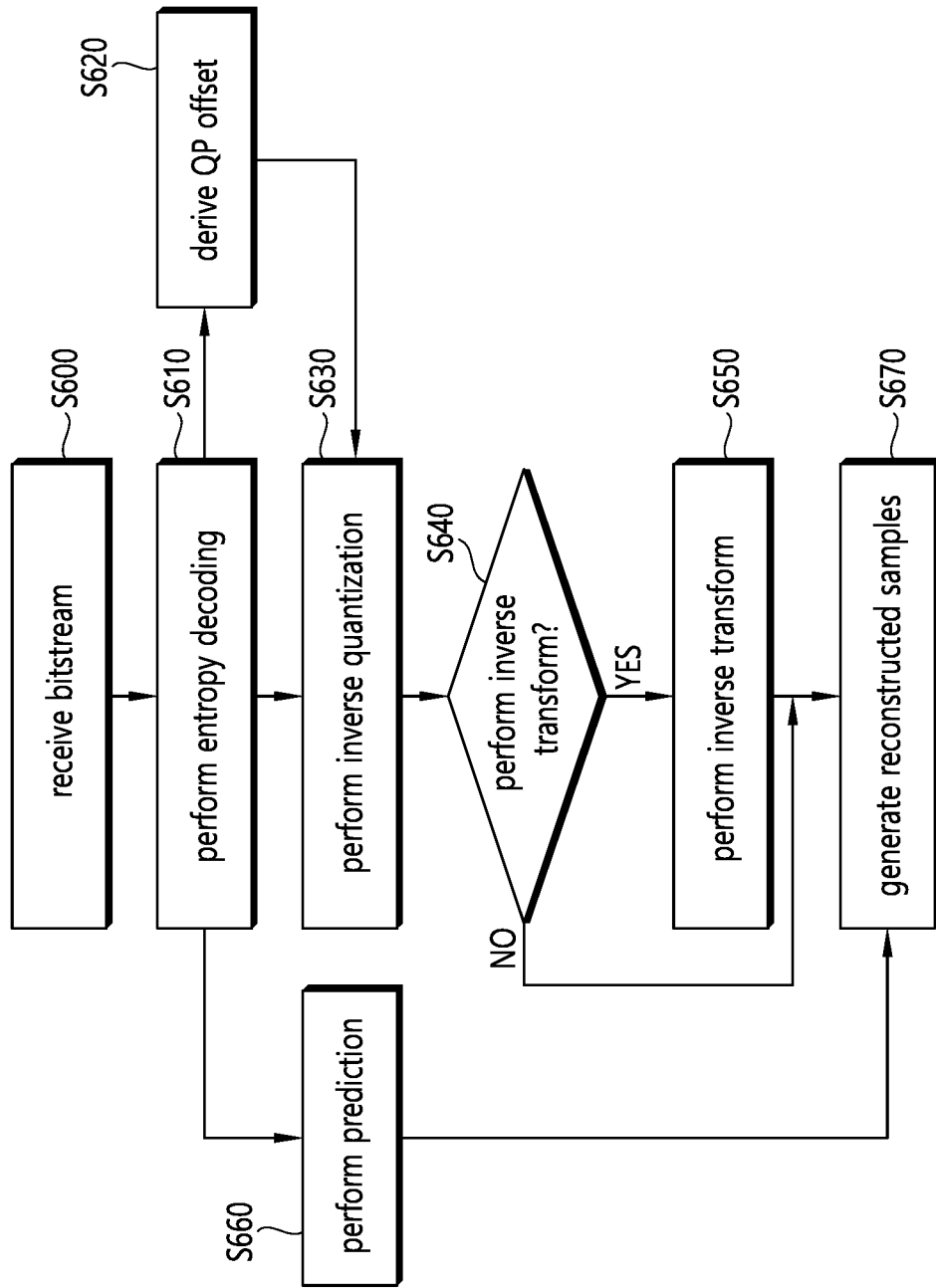
FIG. 6 is a flow chart illustrating a process of reconstructing a picture according to another embodiment.

The predicted luma quantization parameter $qP_{Y\_PRED}$ is derived as follows.

$$qP_{Y\_PRED} = (qP_{Y\_A} + qP_{Y\_B} + 1) >> 1 \quad \text{[Math FIG. 6]}$$

Where, the variable $qP_{Y\_A}$ and $qP_{Y\_B}$ indicates quantization parameters from previous quantization group. Here $qP_{Y\_A}$ is set equal to the luma quantization parameter of the coding unit containing the luma coding block covering (xQg−1, yQg). Here, the luma location (xQg, yQg), specifies the top-left luma sample of the current quantization group relative to the top-left luma sample of the current picture. Where, the variable $qP_{Y\_A}$ and $qP_{Y\_B}$ indicate quantization parameters from previous quantization groups. Specifically $qP_{Y\_A}$ is set equal to the luma quantization parameter of the coding unit containing the luma coding block covering (xQg−1, yQg). Here, the luma location (xQg, yQg), specifies the top-left luma sample of the current quantization group relative to the top-left luma sample of the current picture. The variable $qP_{Y\_B}$ is set equal to the luma quantization parameter $Qp_Y$ of the coding unit containing the luma coding block covering (xQg, yQg−1). When $qP_{Y\_A}$ or $qP_{Y\_B}$ is not available it is set equal to $qP_{Y\_PRED}$. Here, $qP_{Y\_PRED}$ is set equal to the luma quantization parameter $Qp_Y$ of the last coding unit in the previous quantization group in decoding order.

Figure 7:
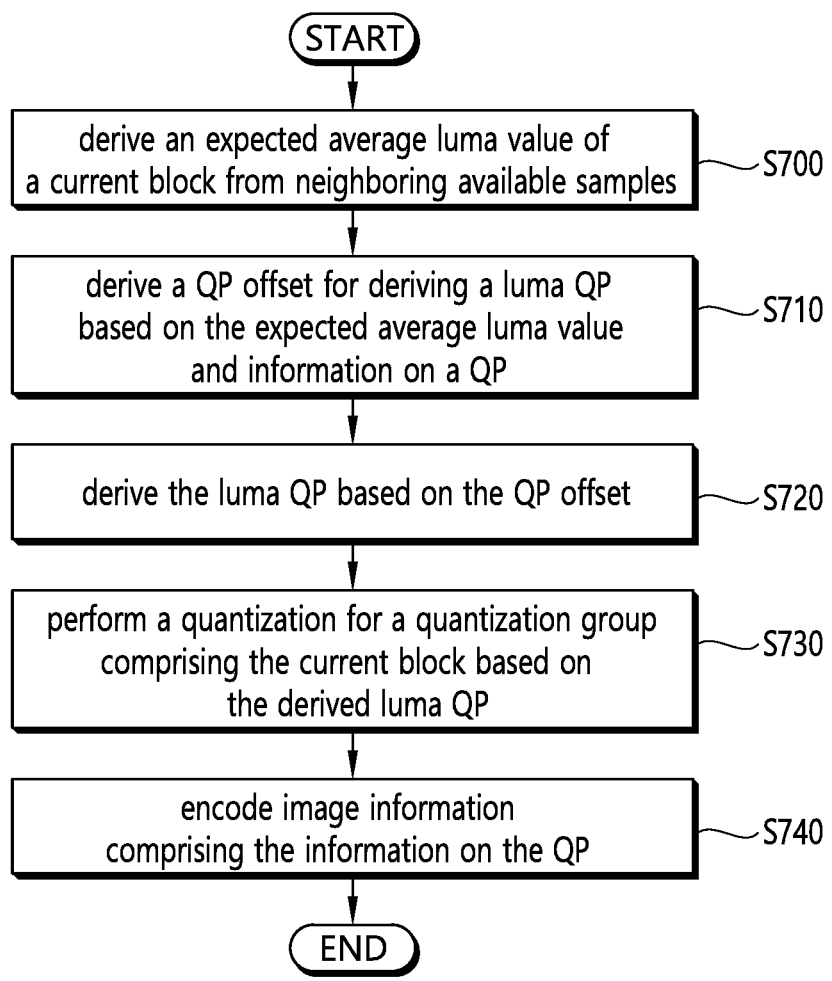
FIG. 7 is a flow chart illustrating an operation of an encoding apparatus according to an embodiment.
Figure 8:
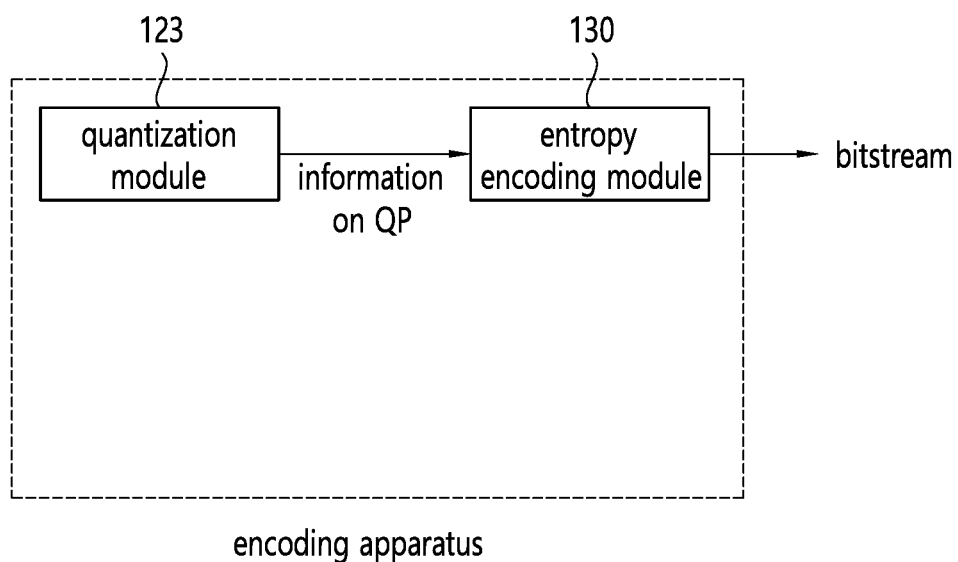
FIG. 8 is a block diagram illustrating a configuration of an encoding apparatus according to an embodiment.

Once $qP_{Y\_PRED}$ is determined then luma quantization parameter is updated by adding CuQpDeltaVal as follow;

$$Qp_Y = (qP_{Y\_PRED} + CuQpDeltaVal + 52 + 2*QpBdOffset_Y) \% (52 + QpBdOffset_Y)) - QpBdOffset_Y \quad \text{[Math FIG. 7]}$$

Where CuQpDeltaVal value is transmitted over bitstream through two syntax elements, such as cu_qp_delta_abs and cu_qp_delta_sign_flag. $QpBdOffset_Y$ specifies the value of the luma quantization parameter range offset and it depends on the bit_depth_luma_minus8 (i.e. bit depth of luma−8) as follows.

$$QpBdOffset_Y = 6 * bit\_depth\_luma\_minus8 \quad \text{[Math FIG. 8]}$$

Figure 9:
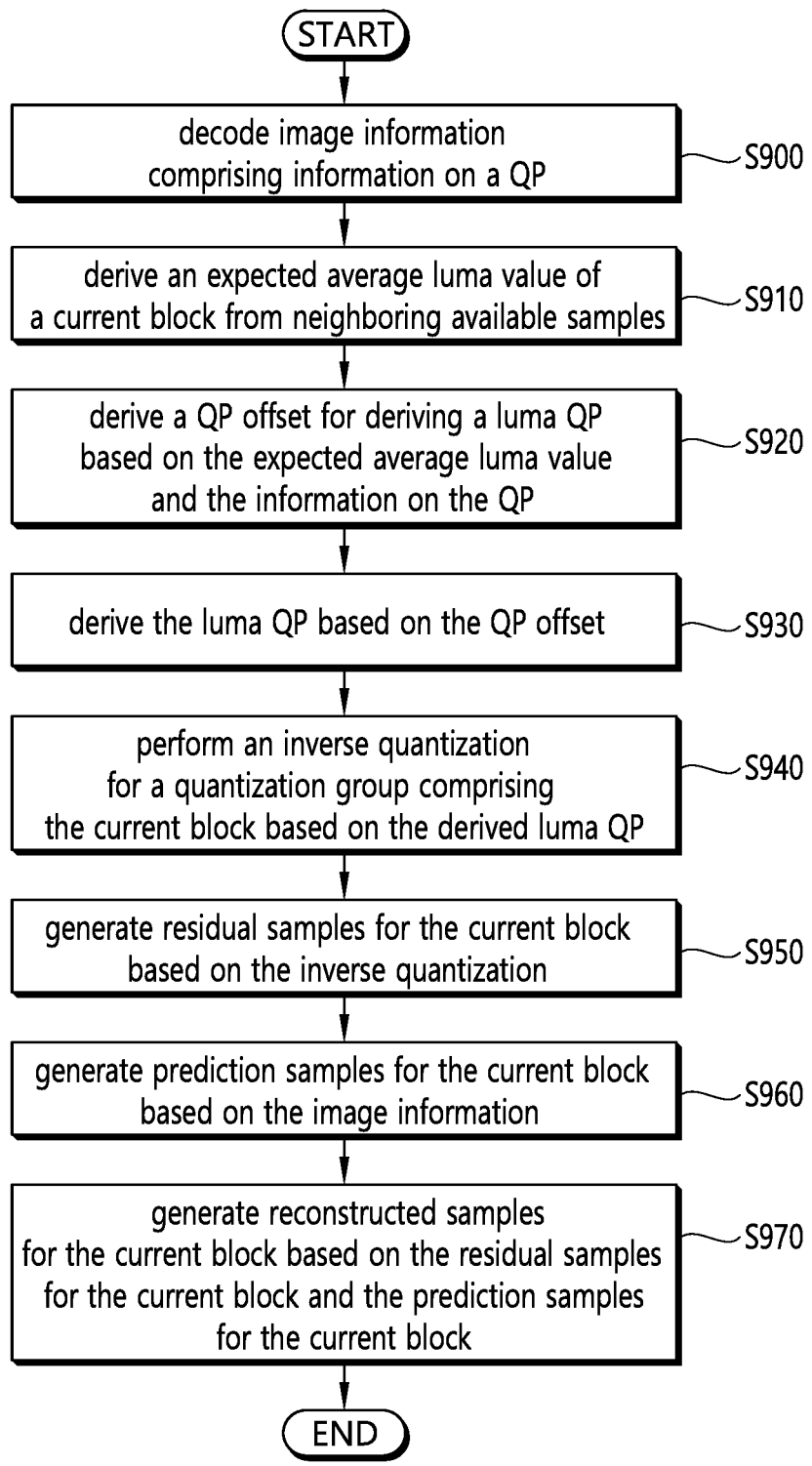
FIG. 9 is a flow chart illustrating an operation of a decoding apparatus according to an embodiment.

Finally the luma quantization parameter $Qp'_Y$ is derived as follows.

$$\text{The luma quantization parameter } Qp'_Y = Qp_Y + QpBdOffset_Y \quad \text{[Math FIG. 9]}$$

Figure 10:
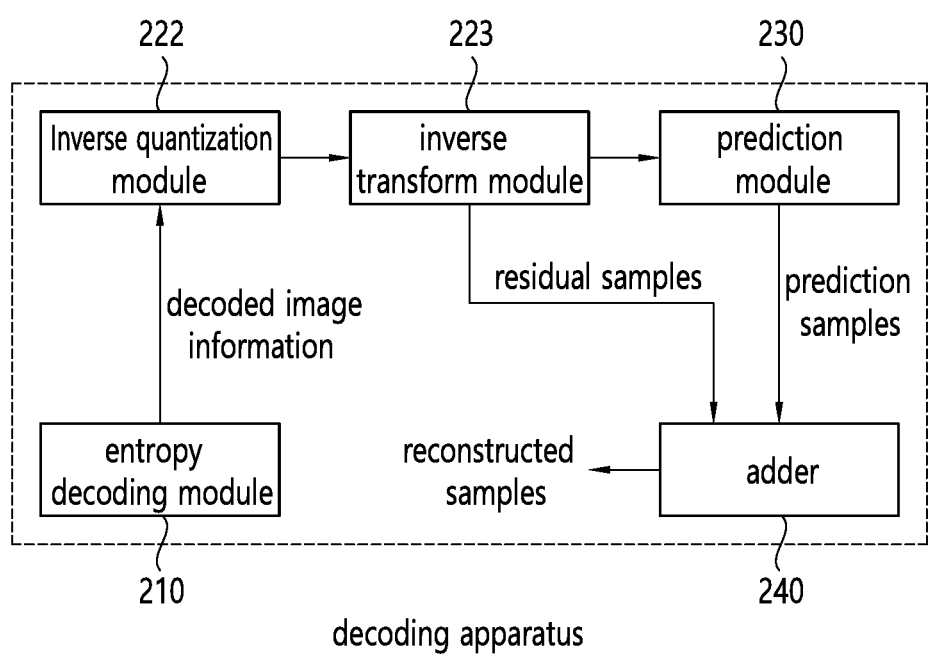
FIG. 10 is a block diagram illustrating a configuration of a decoding apparatus according to an embodiment.

Chroma QP is derived from the luma QP considering PPS level offsets (pps_cb_qp_offset, pps_cr_qp_offset) and slice level offsets (slice_cb_qp_offset, slice_cr_qp_offset) as follows.

$$qPi_{Cb} = Clip3(-QpBdOffset_C, 57, Qp_Y + pps\_cb\_qp\_offset + slice\_cb\_qp\_offset)$$

$$qPi_{Cr} = Clip3(-QpBdOffset_C, 57, Qp_Y + pps\_cr\_qp\_offset + slice\_cr\_qp\_offset) \quad \text{[Math FIG. 10]}$$

The above $qPi_{Cb}$ and $qPi_{Cr}$ are further updated based on below Table 2 and Table 3 to $qP_{Cb}$ and $qP_{Cr}$, respectively.

TABLE 2

| | $qPi_{Cb}$ | | | | | | | | | | | | | | |
|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $qP_{Cb}$ | =$qPi_{Cb}$ | 29 | 30 | 31 | 32 | 33 | 33 | 34 | 34 | 35 | 35 | 36 | 36 | 37 | 37 | =$qPi_{Cb}$ − 6 |

Table 2 represents mapping from $qPi_{Cb}$ to $qP_{Cb}$.

TABLE 3

| | $qPi_{Cr}$ | | | | | | | | | | | | | | |
|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $qP_{Cr}$ | =$qPi_{Cr}$ | 29 | 30 | 31 | 32 | 33 | 33 | 34 | 34 | 35 | 35 | 36 | 36 | 37 | 37 | =$qPi_{Cr}$ − 6 |

Table 3 represents Mapping from $qPi_{Cr}$ to $qP_{Cr}$.

Finally, the chroma quantization parameters for the Cb and Cr components, $Qp'_{Cb}$ and $Qp'_{Cr}$, are derived as follows.

$$Qp'_{Cb} = qP_{Cb} + QpBdOffset_C$$

$$Qp'_{Cr} = qP_{Cr} + QpBdOffset_C \qquad \text{[Math FIG. 11]}$$

$QpBdOffset_C$ specifies the value of the chroma quantization parameter range offset and it depends on the bit_depth_chroma_minus8 (i.e. bit depth of chroma−8) as follows.

$$QpBdOffset_C = 6 * bit\_depth\_chroma\_minus8 \qquad \text{[Math FIG. 12]}$$

Meanwhile, Table 4 represents the definitions of the syntax elements which are used in the present descriptions.

TABLE 4 init_qp_minus26 specifies the initial value minus 26 of $SliceQp_Y$ for each slice. The initial value is modified at the slice segment layer when a non-zero value of slice_qp_delta is decoded, and is modified further when a non-zero value of cu_qp_delta_abs is decoded at the coding unit layer. The value of init_qp_minus26 shall be in the range of −( 26 + $QpBdOffset_Y$ ) to +25, inclusive.
slice_qp_delta specifies the initial value of $Qp_Y$ to be used for the coding blocks in the slice until modified by the value of CuQpDeltaVal in the coding unit layer. The initial value of the $Qp_Y$ quantization parameter for the slice, $SliceQp_Y$, is derived as follows:
$\qquad SliceQp_Y = 26 + init\_qp\_minus26 + slice\_qp\_delta$
The value of $SliceQp_Y$ shall be in the range of −$QpBdOffset_Y$ to +51, inclusive.
slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset + slice_cb_qp_offset shall be in the range of −12 to +12, inclusive.
slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset + slice_cr_qp_offset shall be in the range of −12 to +12, inclusive.
cu_qp_delta_abs specifies the absolute value of the difference CuQpDeltaVal between the luma quantization parameter of the current coding unit and its prediction.
cu_qp_delta_sign_flag specifies the sign of CuQpDeltaVal as follows:
– If cu_qp_delta_sign_flag is equal to 0, the corresponding CuQpDeltaVal has a positive value.
    Otherwise (cu_qp_delta_sign_flag is equal to 1), the corresponding CuQpDeltaVal has a negative value.
When cu_qp_delta_sign_flag is not present, it is inferred to be equal to 0.
When cu_qp_delta_abs is present, the variables IsCuQpDeltaCoded and CuQpDeltaVal are derived as follows:
– $\qquad$ IsCuQpDeltaCoded = 1 $\qquad$ )
$\qquad$ CuQpDeltaVal = cu_qp_delta_abs * ( 1 − 2 * cu_qp_delta_sign_flag ) $\qquad$ )
The value of CuQpDeltaVal shall be in the range of −( 26 + $QpBdOffset_Y$ / 2 ) to +( 25 + $QpBdOffset_Y$ / 2 ), inclusive.

FIG. 6 is a flow chart illustrating a process of reconstructing a picture according to another embodiment.

As S600, S610 and S630 through S670 are correspond to S500 through S560 of FIG. 5, detailed description overlapping with the above description will be omitted or simplified.

According to an embodiment, decoding apparatus may receive bitstream (S600), perform entropy decoding (S610), perform inverse quantization (S60), determine whether to perform inverse transform (S640), perform inverse transform (S650), perform prediction (S660) and generate reconstructed samples (S670). And, in addition, decoding apparatus may derive QP offset (S620) based on the entropy decoding and perform inverse quantization based on the derivation of the QP offset.

S620 may be specified as shown below. At the following, the QP offset may be represented by "Luma_avg_qp".

Once qPY_PRED is determined then luma quantization parameter may be updated by adding Luma_avg_qp as follow.

$$QpY = ((qPY\_PRED + CuQpDeltaVal + Luma\_avg\_qp + 52 + 2*QpBdOffsetY)\%(52 + QpBdOffsetY)) - QpBdOffsetY \qquad \text{[Math FIG. 13]}$$

In one example Luma_avg_qp may be derived (or inferred) from luma values of neighboring pixels (or blocks) which are already decoded and available. Luma_avg_qp may be determined from the neighboring pixel values based on predefined derivation rule. For example Luma_avg_qp may be derived as follows.

$$Luma\_avg\_qp = A*(avg\_luma - M) + B. \qquad \text{[Math FIG. 14]}$$

In Math FIG. 14, avg_luma: the expected average luma value obtained from available (decoded) neighboring pixels (or blocks), M: a predefined value which may depend on the bit-depth, A: scaling factor to map pixel value difference to qp difference (may be pre-defined or be transmitted in bitstream). It indicates the slope of qp mapping, and B: offset value which may be pre-defined or be transmitted in bitstream.

Luma_avg_qp derivation from avg_luma value may not be restricted by the above expressed formula which is one of its plurality. In another example, Luma_avg_qp may be obtained from table mapping as follows.

$$Luma\_avg\_qp = Mapping\_Table\_from\_luma\_to\_QP$$
$$[avg\_luma] \qquad \text{[Math FIG. 15]}$$

where avg_luma is input to the table and output of the table is Luma_avg_qp. In order to reduce the table size, the input value (avg_luma) range may be further reduced as follows.

$$Luma\_avg\_qp = Mapping\_Table\_from\_luma\_to\_QP$$
$$[avg\_luma/D] \qquad \text{[Math FIG. 16]}$$

where D is a predefined constant value to reduce the range of input values.

In an embodiment, Luma_avg_qp may be derived based on information on the QP. Decoding apparatus may obtain the information on the QP from the bitstream. In one example, the information on the QP may comprises init_qp_minus26, slice_qp_delta, slice_cb_qp_offset, slice_cr_qp_offset, cu_qp_delta_abs and cu_qp_delta_sign_flag. Further, the information on the QP is not limited by the above listed examples.

FIG. 7 is a flow chart illustrating an operation of an encoding apparatus according to an embodiment, and FIG. 8 is a block diagram illustrating a configuration of an encoding apparatus according to an embodiment.

Each step disclosed in FIG. 7 can be performed by the encoding apparatus 100 disclosed in FIG. 1. More specifically, S700 to S730 may be performed by the quantization module 123 shown in FIG. 1, and S740 may be performed by the entropy encoding module 130 shown in FIG. 1. In addition, operations according to S700 to S740 are based on some of the descriptions described above in FIG. 6. Therefore, detailed description overlapping with the above-described contents in FIG. 1 and FIG. 6 will be omitted or simplified.

As illustrated in FIG. 8, encoding apparatus according to an embodiment may comprise quantization module 123 and entropy encoding module 130. However, in some cases, all of the components shown in FIG. 8 may not be essential components of the encoding apparatus may be implemented by more or fewer components than those shown in FIG. 8.

The quantization module 123 and the entropy encoding module 130 in the decoding apparatus according to an embodiment may be implemented as separate chips, or at least two or more components may be implemented through one chip.

The encoding apparatus according to an embodiment may derive an expected average luma value of a current block from neighboring available samples (S700). More specifically, the quantization module 123 of the encoding apparatus may derive an expected average luma value of a current block from neighboring available samples.

The encoding apparatus according to an embodiment may derive a QP offset for deriving a luma QP based on the expected average luma value and information on a QP (S710). More specifically, the quantization module 123 of the encoding apparatus may derive a QP offset for deriving a luma QP based on the expected average luma value and information on a QP.

The encoding apparatus according to an embodiment may derive the luma QP based on the QP offset (S720). More specifically, the quantization module 123 of the encoding apparatus may derive the luma QP based on the QP offset.

The encoding apparatus according to an embodiment may perform a quantization for a quantization group comprising the current block based on the derived luma QP (S730). More specifically, the quantization module 123 of the encoding apparatus may perform a quantization for a quantization group comprising the current block based on the derived luma QP.

The encoding apparatus according to an embodiment may encode image information comprising the information on the QP (S740). More specifically, the entropy encoding module 130 may encode image information comprising the information on the QP.

According to FIG. 7 and FIG. 8, the encoding apparatus according to an embodiment may derive an expected average luma value of a current block from neighboring available samples (S700), derive a QP offset for deriving a luma QP based on the expected average luma value and information on a QP (S710), perform a quantization for a quantization group comprising the current block based on the derived luma QP (S730), and encode image information comprising the information on the QP (S740). Consequently, the quantization parameter may be derived efficiently and overall coding efficiency may be enhanced.

FIG. 9 is a flow chart illustrating an operation of a decoding apparatus according to an embodiment, and FIG. 10 is a block diagram illustrating a configuration of a decoding apparatus according to an embodiment.

Each step disclosed in FIG. 9 can be performed by the decoding apparatus 200 disclosed in FIG. 2. More specifically, S900 may be performed by the entropy decoding module 210 shown in FIG. 2, S910 to S940 may be performed by the inverse quantization module 222 shown in FIG. 2, S950 may be performed by the inverse transform module 223 as shown in FIG. 2, S960 may be performed by the prediction module 230 as shown in FIG. 2 and S970 may be performed by the adder 240 shown in FIG. 2. In addition, operations according to S900 to S970 are based on some of the descriptions described above in FIG. 6. Therefore, detailed description overlapping with the above-described contents in FIG. 2 and FIG. 6 will be omitted or simplified.

As illustrated in FIG. 10, decoding apparatus according to an embodiment may comprise entropy decoding module 210, inverse quantization module 222, inverse transform module 223, prediction module 230, and adder 240. However, in some cases, all of the components shown in FIG. 10 may not be essential components of the encoding apparatus may be implemented by more or fewer components than those shown in FIG. 10.

The entropy decoding module 210, inverse quantization module 222, inverse transform module 223, prediction module 230, and adder 240 in the decoding apparatus according to an embodiment may be implemented as separate chips, or at least two or more components may be implemented through one chip.

The decoding apparatus according to an embodiment may decode image information comprising information on a QP (S900). More specifically, entropy decoding module 210 in the decoding apparatus may decode image information comprising information on a QP.

In one embodiment, the information on the QP is signaled in Sequence Parameter Set (SPS) level.

In one embodiment, the image information comprises information on Effective Data Range Parameters (EDRP), and the information on the EDRP comprises at least one of a minimum input value, a maximum input value, dynamic range of input value, mapping information for relating the minimum input value with brightness, mapping information for relating the maximum input value with brightness and identification information of transfer function. This method may be indicated as range matching.

More specifically, this invention may be utilized to efficiently code image/video contents where the range of code words (input value) is restricted. It may occur often in HDR content because of using transfer function supports high luminance. It may also occur when transforming SDR data using a luminance transform functions corresponding to HDR data. In these cases, a video encoder may be configured to signal effective data range parameters (EDRP). And decoder may be configured to receive EDRP associated with the video data, and utilize EDRP data in decoding process. EDRP data may include, for example, minimum input value, maximum input value, dynamic range of the input value (indicates the difference between maximum input value and minimum input value), mapping information between minimum input value and its corresponding brightness, mapping information between maximum input value and its corresponding brightness, transfer function identification (known transfer functions may be identified by their assigned ID number and the detailed mapping information for each transfer function may be available), and so on.

For example, EDRP data may be signaled in a slice header, a picture parameter set (PPS), or sequence parameter set (SPS). In this manner, EDRP data may be used to further modify coded values during decoding process.

This invention introduces quality control parameter (QCP) to specify further adjustment of quantization parameter. And decoder may be configured to receive QCP associated with the video data, and utilize QCP data in decoding process.

The decoding apparatus according to an embodiment may derive an expected average luma value of a current block from neighboring available samples (S910). More specifically, inverse quantization module 222 in the decoding apparatus may derive an expected average luma value of a current block from neighboring available samples.

The decoding apparatus according to an embodiment may derive a QP offset for deriving a luma QP based on the expected average luma value and the information on the QP (S920). More specifically, inverse quantization module 222 in the decoding apparatus may derive a QP offset for deriving a luma QP based on the expected average luma value and the information on the QP.

In one embodiment, the QP offset is derived based on a below equation.

$$\text{Luma\_avg\_qp}=A*(\text{avg\_luma}-M)+B \quad \text{[Math FIG. 17]}$$

wherein the Luma_avg_qp in the equation represents the QP offset, the avg_luma in the equation represents the expected average luma value, the A in the equation represents a scaling factor for mapping a pixel value difference to a QP difference, the M in the equation represents a predefined value related to a bit-depth, and the B in the equation represents a offset value, and wherein the A and the B are predetermined values or values included in the image information.

In one embodiment, the QP offset is derived from a mapping table which is based on the expected average luma value, and the mapping table is determined by using the expected average luma value as an input.

In one embodiment, the QP offset is derived from a mapping table which is based on the expected average luma value, and the mapping table is determined by using a value obtained by dividing the expected average luma value with a predefined constant value.

In one embodiment, the neighboring available samples comprise at least one of at least one luma sample adjacent to left boundary of the quantization group and at least one luma sample adjacent to upper boundary of the quantization group.

In one embodiment, the at least one luma sample adjacent to the left boundary of the quantization group is included in a luma sample column directly adjacent to the left boundary of the quantization group, and the at least one luma sample adjacent to the upper boundary of the quantization group is included in a luma sample row directly adjacent to the upper boundary of the quantization group.

In one embodiment, the neighboring available samples comprise a luma sample adjacent to left side of top-left sample of the quantization group, and the neighboring available samples comprise a luma sample adjacent to upper side of top-left sample of the quantization group.

In one embodiment, the neighboring available samples comprise at least one of reconstructed neighboring samples, samples included in at least one of reconstructed neighboring block, predicted neighboring samples and samples included in at least one of predicted neighboring block.

In one embodiment, avg_luma may be derived from neighboring pixel values (blocks). avg_luma indicates the expected average luma value obtained from available (already decoded) neighboring pixels (or blocks).

i) Available neighboring pixels may include:
Pixels located in (xQg−1, yQg+K) Here, the luma location (xQg, yQg), specifies the top-left luma sample of the current quantization group relative to the top left luma sample of the current picture. (the very left line to the current block)
Pixels located in (xQg+K, yQg−1) Here, the luma location (xQg, yQg), specifies the top-left luma sample of the current quantization group relative to the top left luma sample of the current picture. (the very above line to the current block)

Instead of one line, multiple lines may be used.

ii) Available neighboring block may be used to calculate avg_luma:
A block including a pixel located at (xQg−1, yQg) may be used
A block including a pixel located at (xQg, yQg−1) may be used iii) Avg_luma value may be calculated based on reconstructed neighboring pixels/blocks.

iv) Avg_luma value may be calculated based on predicted neighboring pixels/blocks.

In one embodiment, the information on the QP comprises at least one syntax element related to the QP offset, and the deriving the QP offset based on the at least one of the expected average luma value and the information on the QP comprises deriving the QP offset based on at least one syntax element related to the QP offset.

A new syntax element may be introduced to consider Luma_avg_qp. For example, Luma_avg_qp value may be transmitted over bitstream. It may further be specified through two syntax elements, such as Luma_avg_qp_abs and Luma_avg_qp_flag.

Luma_avg_qp may be indicated by two syntax elements (luma_avg_qp_delta_abs and luma_avg_qp_delta_sign_flag).

luma_avg_qp_delta_abs specifies the absolute value of the difference CuQpDeltaLumaVal between the luma quantization parameter of the current coding unit and its luma quantization parameter derived without considering luminance.

luma_avg_qp_delta_sign_flag specifies the sign of CuQpDeltaLumaVal as follows:

If luma_avg_qp_delta_sign_flag is equal to 0, the corresponding CuQpDeltaLumaVal has a positive value.

Otherwise (luma_avg_qp_delta_sign_flag is equal to 1), the corresponding CuQpDeltaLumaVal has a negative value.

When luma_avg_qp_delta_sign_flag is not present, it is inferred to be equal to 0.

When luma_avg_qp_delta_sign_flag is present, the variables IsCuQpDeltaLumaCoded and CuQpDeltaLumaVal are derived as follows:

IsCuQpDeltaLumaCoded=1

$$\text{CuQpDeltaLumaVal}=\text{cu\_qp\_delta\_abs}*(1-2*\text{luma\_avg\_qp\_delta\_sign\_flag}) \quad \text{[Math FIG. 18]}$$

CuQpDeltaLumaVal specifies the difference between a luma quantization parameter for the coding unit containing Luma_avg_qp and a luma quantization parameter for the coding unit without Luma_avg_qp.

In one embodiment, syntax elements described above may be transmitted in a quantization group level (or quantization unit level)(for example, CU, CTU or predefined block unit).

The decoding apparatus according to an embodiment may derive the luma QP based on the QP offset (S930). More specifically, inverse quantization module 222 in the decoding apparatus may derive the luma QP based on the QP offset.

The decoding apparatus according to an embodiment may perform an inverse quantization for a quantization group comprising the current block based on the derived luma QP (S940). More specifically, inverse quantization module 222 in the decoding apparatus may perform an inverse quantization for a quantization group comprising the current block based on the derived luma QP.

In one embodiment, the decoding apparatus may derive a chroma QP from the derived luma QP based on at least one chroma QP mapping table and perform the inverse quantization for the quantization group based on the derived luma QP and the derived chroma QP, wherein the at least one chroma QP mapping table is based on dynamic range of chroma and the QP offset.

In one embodiment, instead of one chroma QP mapping table, multiple chroma QP derivation table may exist. Additional information may be required to specify what QP mapping table to be used. The following is an example of another chroma QP derivation table.

TABLE 5

| | $qPi_{Cb}$ | | | | | | | | | | | | | | | |
|---|---|---|---|---|---|---|---|---|---|---|---|---|---|---|---|---|
| | <26 | 26 | 27 | 28 | 29 | 30 | 31 | 32 | 33 | 34 | 35 | 36 | 37 | 38 | 39 | >39 |
| $qP_{Cb}$ | $=qPi_{Cb}$ | 26 | 27 | 27 | 28 | 29 | 29 | 30 | 30 | 31 | 31 | 32 | 32 | 33 | 33 | $=qPi_{Cb}-6$ |

In one embodiment, the at least one chroma QP mapping table comprises at least one Cb QP mapping table and at least one Cr QP mapping table.

The decoding apparatus according to an embodiment may generate residual samples for the current block based on the inverse quantization (S950). More specifically, inverse transform module 223 in the decoding apparatus may generate residual samples for the current block based on the inverse quantization.

The decoding apparatus according to an embodiment may generate prediction samples for the current block based on the image information (S960). More specifically, prediction module 230 in the decoding apparatus may generate prediction samples for the current block based on the image information.

The decoding apparatus according to an embodiment may generate reconstructed samples for the current block based on the residual samples for the current block and the prediction samples for the current block (S970). More specifically, adder in the decoding apparatus may generate reconstructed samples for the current block based on the residual samples for the current block and the prediction samples for the current block.

According to FIG. 9 and FIG. 10, the decoding apparatus according to an embodiment may decode image information comprising information on a QP (S900), derive an expected average luma value of a current block from neighboring available samples (S910), derive a QP offset for deriving a luma QP based on the expected average luma value and the information on the QP (S920), derive the luma QP based on the QP offset (S930), perform an inverse quantization for a quantization group comprising the current block based on the derived luma QP (S940), generate residual samples for the current block based on the inverse quantization (S950), generate prediction samples for the current block based on the image information (S960), and generate reconstructed samples for the current block based on the residual samples for the current block and the prediction samples for the current block (S970). Consequently, the quantization parameter may be derived efficiently and overall coding efficiency may be enhanced.

The above-described method according to the present invention can be implemented in software, and the encoding apparatus and/or decoding apparatus according to the present invention may be included in image processing apparatus such as a TV, a computer, a smart phone, display device, etc.

When the embodiments of the present invention are implemented in software, the above-described method may be implemented by a module (a process, a function, and the like) that performs the functions described above. The module is stored in memory and can be executed by the processor. The memory may be internal or external to the processor and may be coupled to the processor by any of a variety of well known means. The processor may include an application specific integrated circuit (ASIC), other chipset, logic circuitry and/or a data processing device. The memory may include read-only memory (ROM), random access memory (RAM), flash memory, memory cards, storage media, and/or other storage devices.

The invention claimed is:

1. A picture decoding method, by a decoding apparatus, comprising:
   obtaining image information including information related to a quantization parameter (QP) from a bitstream;
   deriving a luma QP based on the information related to the QP;
   deriving chroma QPs based on the information related to the QP, wherein the chroma QPs include a first chroma QP for a Cb component and a second chroma QP for a Cr component;
   generating a reconstructed picture including reconstructed samples based on the luma QP, the first chroma QP for the Cb component and the second chroma QP for the Cr component,
   wherein deriving the chroma QPs comprises:
   deriving the first chroma QP for the Cb component based on the luma QP and a first chroma QP mapping table for the Cb component; and
   deriving the second chroma QP for the Cr component based on the luma QP and a second chroma QP mapping table for the Cr component,
   wherein both an input of the first chroma QP mapping table and an input of the second chroma mapping table are based on the luma QP, wherein the first chroma QP mapping table for the Cb component is a separate mapping table from the second chroma QP mapping table for the Cr component, and wherein the first chroma QP for the Cb component derived based on the first chroma QP mapping table for the Cb component is different from the second chroma QP for the Cr component derived based on the second chroma QP mapping table for the Cr component.

2. The method of claim 1, wherein the deriving luma QP comprises:

deriving an average luma value of a current block based on neighboring samples;

deriving a quantization parameter offset (QP offset) for deriving the luma QP based on the average luma value and the information related to the QP; and deriving the luma QP based on the QP offset, wherein the QP offset is derived based on a below equation, $$Luma\_avg\_qp = A^*(avg\_luma - M) + B$$

wherein the Luma_avg_qp in the equation represents the QP offset, the avg_luma in the equation represents the average luma value, the A in the equation represents a scaling factor for mapping a pixel value difference to a QP difference, the M in the equation represents a predefined value related to a bit-depth, and the B in the equation represents a offset value, and wherein the A and the B are predetermined values or values included in the image information.

3. The method of claim 1, wherein the deriving luma QP comprises:

deriving an average luma value of a current block based on neighboring samples;

deriving a quantization parameter offset (QP offset) for deriving the luma QP based on the average luma value and the information related to the QP; and deriving the luma QP based on the QP offset, wherein the QP offset is derived from a mapping table which is based on the average luma value, and wherein an output of the mapping table is determined by using the average luma value as an input.

4. The method of claim 1, wherein the deriving luma QP comprises:

deriving an average luma value of a current block based on neighboring samples;

deriving a quantization parameter offset (QP offset) for deriving the luma QP based on the average luma value and the information related to the QP; and deriving the luma QP based on the QP offset, wherein the QP offset is derived from a mapping table which is based on the average luma value, and wherein the mapping table is determined by using a value obtained by dividing the average luma value with a predefined constant value.

5. The method of claim 1, wherein the deriving luma QP comprises:

deriving an average luma value of a current block based on neighboring samples;

deriving a quantization parameter offset (QP offset) for deriving the luma QP based on the average luma value and the information related to the QP; and deriving the luma QP based on the QP offset, wherein the neighboring samples comprise luma samples adjacent to a left boundary of a quantization group comprising the current block, wherein the luma samples adjacent to the left boundary of the quantization group are included in at least one luma sample column directly adjacent to the left boundary of the quantization group, and wherein the luma samples adjacent to the left boundary of the quantization group are included in multiple lines.

6. The method of claim 1, wherein the deriving luma QP comprises:

deriving an average luma value of a current block based on neighboring samples;

deriving a quantization parameter offset (QP offset) for deriving the luma QP based on the average luma value and the information related to the QP; and deriving the luma QP based on the QP offset, wherein the neighboring samples comprise a luma sample adjacent to left side of top-left sample of the quantization group, and wherein the neighboring samples comprise a luma sample adjacent to upper side of top-left sample of the quantization group.

7. The method of claim 1, wherein the deriving luma QP comprises:

deriving an average luma value of a current block based on neighboring samples;

deriving a quantization parameter offset (QP offset) for deriving the luma QP based on the average luma value and the information related to the QP; and deriving the luma QP based on the QP offset, wherein the neighboring samples comprise at least one of reconstructed neighboring samples, samples included in at least one of reconstructed neighboring block, predicted neighboring samples and samples included in at least one of predicted neighboring block.

8. The method of claim 1, wherein the deriving luma QP comprises:

deriving an average luma value of a current block based on neighboring samples;

deriving a quantization parameter offset (QP offset) for deriving the luma QP based on the average luma value and the information related to the QP; and deriving the luma QP based on the QP offset, wherein the information related to the QP comprises at least one syntax element related to the QP offset, and the deriving the QP offset based on the at least one of the average luma value and the information related to the QP comprises deriving the QP offset based on at least one syntax element related to the QP offset.

9. The method of claim 1, wherein the information related to the QP is signaled in Sequence Parameter Set (SPS) level.

10. The method of claim 1, wherein the image information comprises information on Effective Data Range Parameters (EDRP), and wherein the information on the EDRP comprises at least one of a minimum input value, a maximum input value, dynamic range of input value, mapping information for relating the minimum input value with brightness, mapping information for relating the maximum input value with brightness and identification information of transfer function.

11. A picture encoding method, by an encoding apparatus, comprising:

deriving a luma quantization parameter (QP);

deriving chroma QPs, wherein the chroma QPs include a first chroma QP for a Cb component and a second chroma QP for a Cr component;

generating information related to QP; and encoding image information comprising the information related to the QP, wherein deriving the chroma QPs comprises:
deriving the first chroma QP for the Cb component based on the luma QP and a first chroma QP mapping table for the Cb component; and
deriving the second chroma QP for the Cr component based on the luma QP and a second chroma QP mapping table for the Cr component,
wherein both an input of the first chroma QP mapping table and an input of the second chroma mapping table are based on the luma QP,
wherein the first chroma QP mapping table for the Cb component is a separate mapping table from the second chroma QP mapping table for the Cr component, and
wherein the first chroma QP for the Cb component derived based on the first chroma QP mapping table for the Cb component is different from the second chroma QP for the Cr component derived based on the second chroma QP mapping table for the Cr component.

12. The method of claim 1, wherein the luma QP is derived further based on a first luma QP of a coding unit containing a luma coding block covering (xQg−1, yQg) and a second luma QP of a coding unit containing a luma coding block covering (xQg, yQg−1), and
wherein (xQg, yQg) represents a top-left sample position of a current quantization group.

13. The method of claim 1, wherein based on the same luma QP being used for the inputs of the first chroma QP mapping table and the second chroma mapping table, an output of the first chroma QP mapping table is different form an output of the second chroma mapping table.

14. A non-transitory computer-readable storage medium storing encoded image information generated by a method, the method comprising:
deriving a luma quantization parameter (QP);
deriving chroma QPs, wherein the chroma QPs include a first chroma QP for a Cb component and a second chroma QP for a Cr component;
generating information related to QP; and
encoding image information comprising the information related to the QP,
wherein deriving the chroma QPs comprises:
deriving the first chroma QP for the Cb component based on the luma QP and a first chroma QP mapping table for the Cb component; and
deriving the second chroma QP for the Cr component based on the luma QP and a second chroma QP mapping table for the Cr component,
wherein both an input of the first chroma QP mapping table and an input of the second chroma mapping table are based on the luma QP,
wherein the first chroma QP mapping table for the Cb component is a separate mapping table from the second chroma QP mapping table for the Cr component, and
wherein the first chroma QP for the Cb component derived based on the first chroma QP mapping table for the Cb component is different from the second chroma QP for the Cr component derived based on the second chroma QP mapping table for the Cr component.

* * * * *